Jan. 26, 1926. 1,570,832
J. HASSELBERG
POWER STEERING MECHANISM FOR LOGGING TRUCKS
Filed Oct. 20, 1924 3 Sheets-Sheet 3

INVENTOR
JENS HASSELBERG,
BY
ATTY.

Patented Jan. 26, 1926.

1,570,832

UNITED STATES PATENT OFFICE.

JENS HASSELBERG, OF KLAMATH FALLS, OREGON.

POWER STEERING MECHANISM FOR LOGGING TRUCKS.

Application filed October 20, 1924. Serial No. 744,680.

*To all whom it may concern:*

Be it known that I, JENS HASSELBERG, a citizen of the United States, and a resident of Klamath Falls, in the county of Klamath and State of Oregon, have invented a new and useful Improvement in a Power Steering Mechanism for Logging Trucks, of which the following is a specification.

My invention relates to improvements in steering mechanism for logging trucks and the like and particularly to an improved mechanism whereby such trucks may be steered by power derived from the engine of the truck.

My invention is particularly intended for use with logging trucks used for transporting logs. Trucks of this character are designed to carry extremely heavy loads over very poor roads, and, as the trucks themselves are large and unwieldy, the steering of the trucks is accomplished only with much difficulty.

The primary object of my invention is therefore to provide an improved steering mechanism whereby trucks of the character described may be steered by power derived from the engine supplying the motive power of the truck.

Another object is to provide an improved steering mechanism whereby both the front and rear wheels of a truck are moved simultaneously by power to steer the truck.

A further object is to provide an improved mechanism of the character described which will operate the wheels in either direction through a single set of driving connections and which will prevent damage to said driving connections should power be applied after the limit of movement in either direction has been reached.

Another object is to provide an improved steering mechanism by which heavy trucks may be steered quickly and easily.

A still further object is to provide an improved steering mechanism which will lock the wheels against pivotal movement to prevent displacement due to irregularities in the road.

I accomplish these and other objects by means of the device disclosed in the drawings forming a part of the present specification wherein like characters of reference are used to designate similar parts throughout the said specification and drawings and in which, Fig. 1 is a side elevation of a logging truck provided with my improved power steering mechanism.

Figure 1:
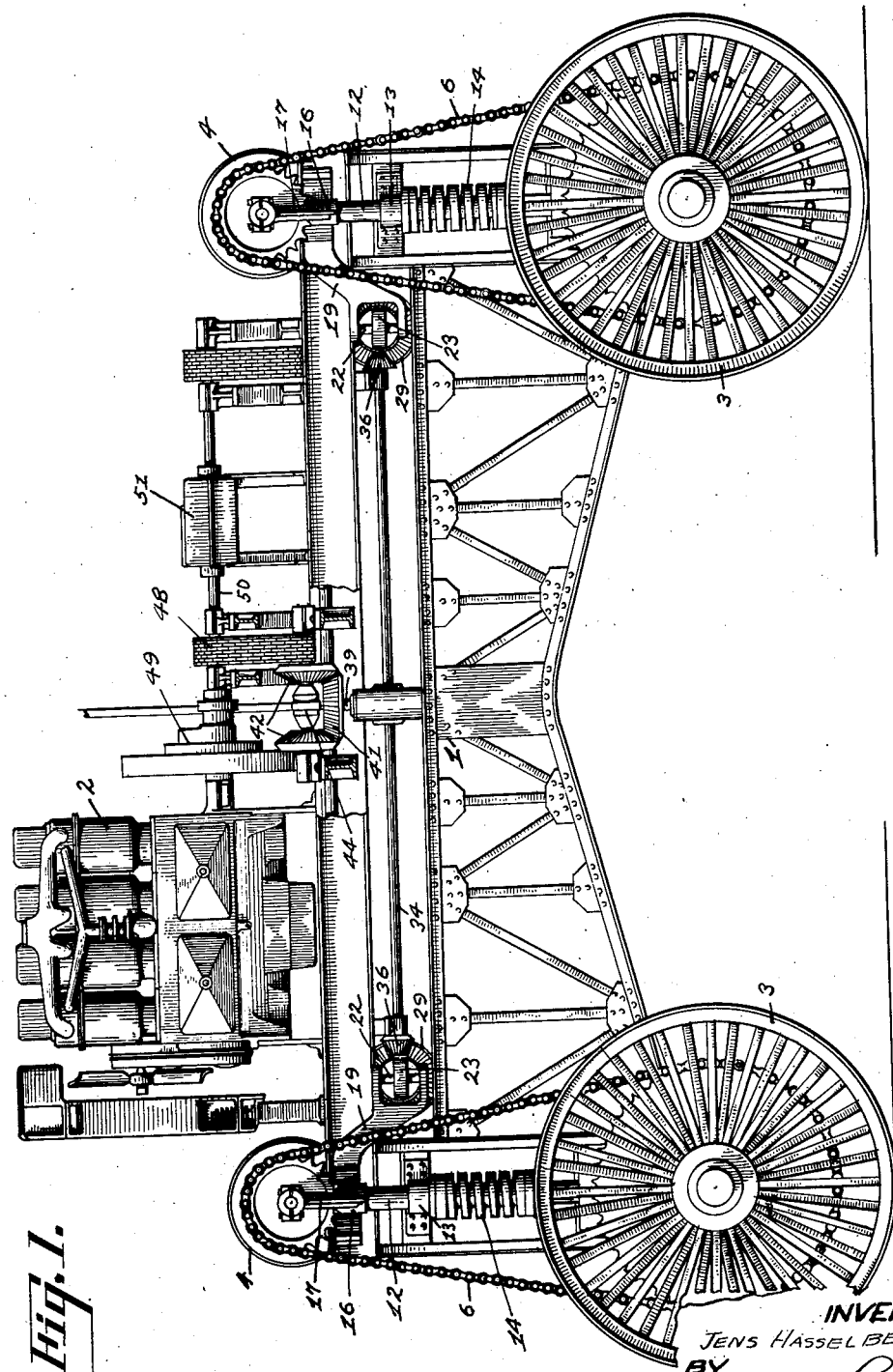

Referring to the drawings, the numeral 1 is used to designate in general a logging truck provided with an engine 2 arranged to deliver power to the wheels 3 of the truck, power being directed to the front and rear wheels 3 through differentials 4 arranged to drive chains 6 connected to the wheels through shafts 7 provided with universal joints 8 and spline connections 9 adapted to permit pivotal and vertical movement of each wheel relative to the body of the truck. The wheels 3 are mounted upon axles 11 carried by vertically disposed rods 12 slidably and pivotally mounted within bearings 13 mounted upon the sides of the body of the truck, the weight of said truck and its load being supported by springs 14 mounted around the rods 12.

Members 16 are secured upon the upper ends of the rods 12, said members being provided with extensions 17 and 18 forming bearings for the upper driving connections for the wheels. Steering knuckles designated in general by the numeral 19 are secured in connection with each member 16, said steering knuckles consisting of body portions adapted to be riveted or otherwise secured at one end to extensions 21 formed upon the members 16 and bifurcated at the opposite end to receive bearing pins 22 slidably and pivotally engaged by bearing portions 23 formed upon the ends of reach rods 24 connecting the front and rear steering knuckles respectively.

Figure 4:
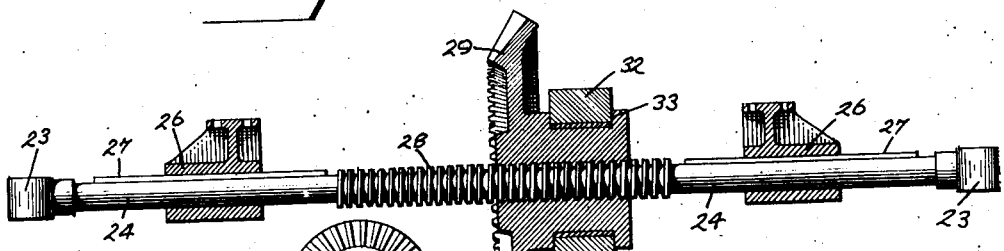
Fig. 4 is a sectional detail of one of the reach rods showing the manner in which it is mounted and actuated.
Figure 5:
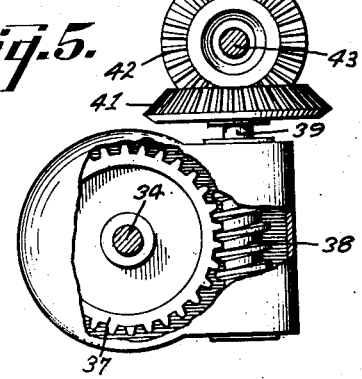
Fig. 5 is a sectional detail showing the manner in which the steering shaft is driven.

The reach rods 24 are slidably mounted within bearings 26 secured upon the body frame of the truck and are provided with keys 27 adapted to prevent rotation of the rods 24 within said bearings. Each rod 24 is threaded along the middle portion as at 28. Bevel gears 29, provided with internally threaded bores as shown in Fig. 4 of the drawings, are mounted in engagement with the threaded portions 28 of the rods 24, said gears 29 being held against longitudinal movement along the gear by means of collars 32 bolted to the frame of the truck and engaging grooves 33 formed in the hubs of the gears and forming bearings upon which the gears are rotated.

A steering shaft 34 is mounted within suitable bearings secured upon the frame of the truck and provided with gears 36 secured upon the ends thereof in meshing relation with the gears 29. A gear 37 is mounted upon the shaft 34 near the middle thereof, said gear 37 being engaged by a worm gear 38 mounted adjacent thereto upon a shaft 39 upon the upper end of which is mounted a bevel gear 41. A pair of oppositely faced bevel gears 42 are mounted upon a shaft 43 in meshing relation with the gear 41, said gears 42 engaging the gear 41 at diametrically opposite points. A clutch member 44 is feathered onto the shaft 43 between the gears 42 and provided with cone shaped ends adapted to frictionally engage corresponding recesses formed in the adjacent ends of the gears 42, said clutch member being movable to engage either of said gears whereby either gear 42 may be driven by the shaft 43. The gears 42 are normally freely rotatable upon the shaft 43 so that when the clutch member 44 is in neutral position the shaft 43 will rotate freely within the gears and when the clutch is moved to engage one of the gears 42 the other will rotate freely upon the shaft and thereby permit the bevel gear 41 to be driven in either direction. The clutch member 44 is actuated by a forked arm 46 operated by a lever 47.

The shaft 43 is driven by a silent chain 48 or other suitable driving connection to the main drive shaft of the engine 2 between the clutch 49 and transmission 51 thereof whereby the steering mechanism may be operated whether the truck is in motion or not.

Figure 2:
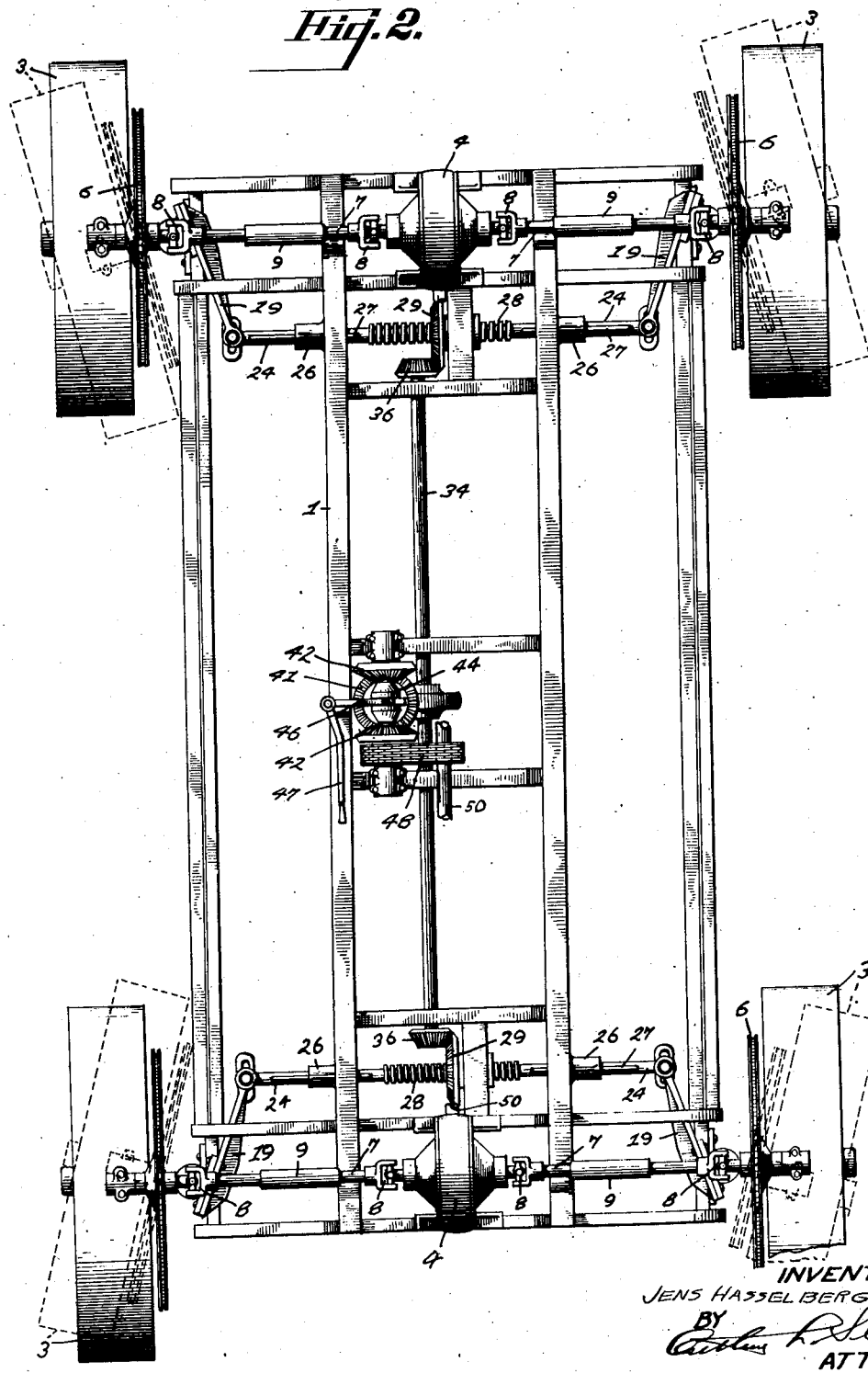
Fig. 2 is a plan view of the truck with the engine and portions of the driving connections omitted and showing the manner in which the wheels are moved to steer the truck.
Figure 3:
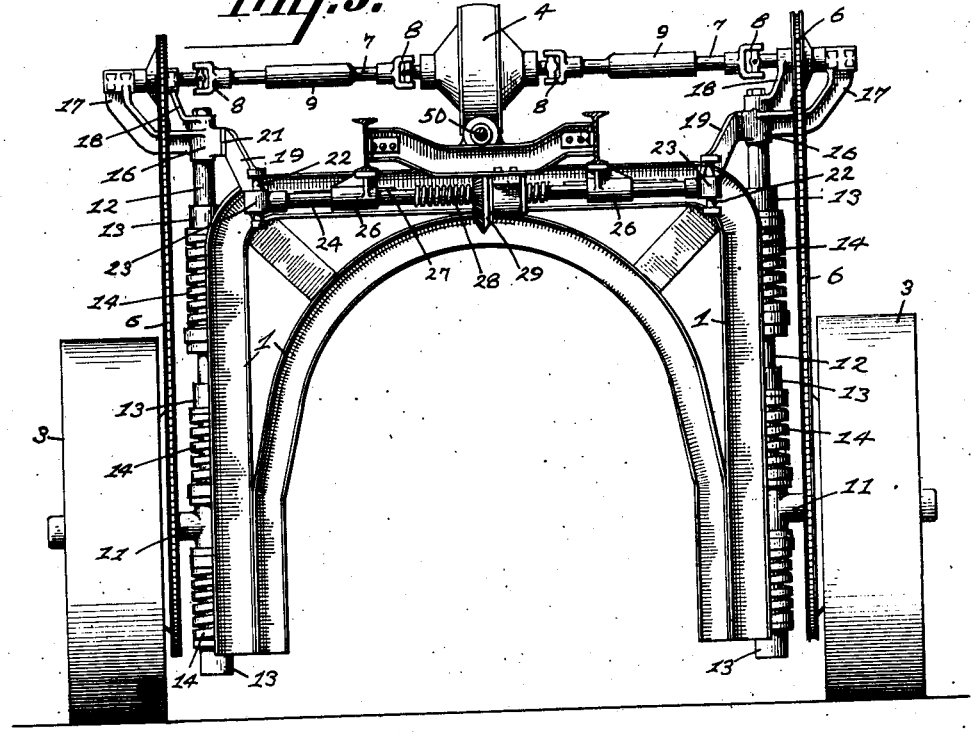
Fig. 3 is a vertical transverse section of the truck.

In operation, the lever 47 is moved manually to cause the clutch member 44 to engage the gear 43 adapted to rotate the steering shaft 34 in the desired direction. As the shaft 34 is rotated the gears 36 cause the bevel gears 29 to be rotated upon the reach rods 24. The gears 29 being held against longitudinal movement upon the rods by the collars 32, the rotation of the gears 29 will cause the rods to be moved axially with respect to the gears by virtue of the threads 28. The movement of the reach rods causes the steering knuckles to impart a pivotal movement to the rods 12 within the bearings 13 and thereby turn the axles 11 and wheels 3 relative to the body of the truck. The reach rods 24 have their threaded portions threaded with threads of opposite pitch so that when the gears 29 are rotated the front and rear rods 24 will be moved in the same direction thereby causing the front and rear wheels 3 to be turned in opposite directions relative to the body as shown in dotted lines in Fig. 2 of the drawings. By turning the wheels in opposite directions in this manner the turning radius of the truck may be greatly reduced and the steering of the truck thus facilitated.

The friction clutch member 44 permits power to be applied gradually to the steering mechanism, thereby avoiding any sudden or excessive strains upon the steering mechanism and permitting the steering members to be readily controlled by the driver of the truck. The friction clutch member also insures against injury to the steering mechanism due to the inadvertently applying power to the steering mechanism after the limit of movement of the whole in either direction has been reached, slippage occurring at a clutch before sufficient power is applied to distort or break the steering connections.

The threaded engagement between the gear 29 and the rods 24 serves to lock the wheels in any desired position relative to the body of the truck. After the rods 24 have been moved by the gear 29 to a desired position for steering the truck the threads 28 hold the rod in position until a rotation of the gear 29 in opposite direction operates to move the rod in the opposite direction. In this manner the wheels will be held against movement when an obstruction or resistance is encountered, thereby maintaining the truck in a desired course without imposing strain or undue effort upon the driver. This is of particular advantage in trucks of the character mentioned as the roads traversed are usually rough and frequently obstructed by objects which would cause the wheels to be moved away from the desired course, unless locked mechanically against such movement.

Having thus described my invention what I claim as new and desire to secure by Letters Patent is,

1. In a logging truck provided with an engine operatively mounted upon the truck for delivering power to the wheels, steering mechanism comprising steering knuckles connected to each wheel for imparting pivotal movement thereto relative to the body of the truck; reach rods connected between the knuckles of the front pair and of the rear pair of wheels respectively, said rods having oppositely pitched threaded portions along the middle portions thereof; gears engaging said threaded portions of the rods; means for holding the gears against longitudinal movement along the rods whereby rotation of the rods will cause the rods to be moved to actuate the steering knuckles; and means actuated by power from the engine for rotating the gears to steer the truck.

2. In a logging truck provided with an engine operatively mounted upon the truck for delivering power to the wheels, steering mechanism comprising steering knuckles connected to each wheel for imparting pivotal movement thereto relative to the body of the truck; reach rods connected between the knuckles of the front pair and of the rear pair of wheels respectively, said rods having oppositely pitched threaded portions along the middle portions thereof; gears engaging said threaded portions of the rods; means for holding the gears against longitudinal movement along the rods whereby rotation of the gears will cause the rods to be moved to actuate the steering knuckles; a steering shaft provided with gears meshing with the gears upon the front and rear reach rods; and means connecting the shaft with the engine whereby the shaft may be rotated in either direction for steering the truck.

3. In a logging truck provided with an engine operatively mounted upon the truck for delivering power to the wheels thereof, steering mechanism comprising steering knuckles connected to each wheel for imparting pivotal movement thereto relative to the body of the truck; reach rods connected between the knuckles of the front pair and the rear pair of wheels respectively, said rods having oppositely pitched threaded portions along the middle portions thereof; gears mounted upon the threaded portions of the rods; means for holding the gears against longitudinal movement relative to the bars whereby rotation of said gears will move the rods to actuate the steering knuckles; a steering shaft provided with gears meshing with the gears upon the front and rear reach rods; reduction gears connected to the steering shaft and adapted to rotate the same in either direction; and means for connecting said reduction gears to the engine whereby power from said engine may be applied for steering the truck.

4. In a logging truck provided with an engine operatively mounted upon the truck for delivering power to the wheels thereof, steering mechanism comprising steering knuckles connected to each wheel for imparting pivotal movement thereto relative to the body of the truck; reach rods connected between the knuckles of the front pair and the rear pair of wheels respectively, said rods having oppositely pitched threaded portions along the middle portions thereof; gears threaded onto the threaded portions of the rods; means for holding the gears against longitudinal movement relative to the rods whereby rotation of the gears will move the rods to actuate the steering knuckles; a steering shaft provided with gears meshing with the gears upon the front and rear reach rods; reduction gears mounted in connection with the steering shaft for rotating the same; and means including a friction clutch connecting the reduction gears with the engine, said clutch being adapted to actuate the reduction gears to rotate the steering shaft in either direction and to permit slippage when the limit of movement in either direction is reached.

5. In a logging truck provided with an engine operatively mounted upon the truck for delivering power to the wheels thereof, steering mechanism comprising steering knuckles connected to each wheel for imparting pivotal movement thereto relative to the body of the truck; reach rods connected between the knuckles of the front pair and the rear pair of wheels respectively, said rods having oppositely pitched threaded portions along the middle portions thereof; gears mounted upon the threaded portions of the rods and held against longitudinal movement thereon whereby rotation of the gears will cause the rod to be moved to actuate the steering knuckles; a steering shaft provided with gears meshing with the gears upon the front and rear reach rods; a worm gear mounted in connection with the steering shaft for rotating the same; a bevel gear mounted in connection with the worm gear; a driving shaft mounted adjacent the bevel gear and adapted to be driven by power from the engine; a pair of oppositely faced bevel drive gears rotatably mounted upon the drive shaft in meshing relation with the bevel gear connected to the worm; and a friction clutch feathered onto the drive shaft between the oppositely faced gears and movable into driving engagement with either of said gears whereby power may be transmitted through said gears to the steering shaft for rotating said shaft in either direction to steer the truck.

6. In a logging truck provided with an engine operatively mounted thereon for delivering power to the wheels thereof, steering mechanism comprising steering knuckles connected to each wheel for imparting pivotal movement thereto relative to the body of the truck; reach rods slidably keyed within bearings secured upon the body of the truck said rods being adapted for slidable movement transversely to said body and having the ends slidably and pivotally connected to the adjacent steering knuckles for imparting movement thereto; threads formed upon the middle portions of the rods; gears mounted in connection with the threads and held against movement whereby rotation of said gears will move the rods transversely to the body of the truck to actuate the steering knuckles; a steering shaft provided with gears meshing with the gears upon the reach rods; a worm and gear mounted in connection with the steering shaft for rotating the same; a bevel gear mounted in connection with the worm; a drive shaft mounted adjacent the bevel gear and connected to the engine to be driven thereby; a pair of bevel gears rotatably mounted upon the drive shaft in meshing relation with the bevel gear connected to the worm; and a friction clutch feathered onto the drive shaft between the oppositely faced gears and movable into driving relation with either of said gears whereby power may be transmitted through said gears to the steering shaft for rotating said shaft in either direction to steer the truck.

In witness whereof I hereunto set my signature.

JENS HASSELBERG.